(12) United States Patent
Sivanesan et al.

(10) Patent No.: US 8,977,268 B2
(45) Date of Patent: Mar. 10, 2015

(54) METHODS AND SYSTEMS FOR CONTROLLING HANDOVERS IN A CO-CHANNEL NETWORK

(75) Inventors: Kathiravetpillai Sivanesan, Richardson, TX (US); Jialin Zou, Randolph, NJ (US); Subramanian Vasudevan, Morristown, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 190 days.

(21) Appl. No.: 13/547,509

(22) Filed: Jul. 12, 2012

(65) Prior Publication Data

US 2013/0023302 A1     Jan. 24, 2013

Related U.S. Application Data

(60) Provisional application No. 61/510,253, filed on Jul. 21, 2011.

(51) Int. Cl.
| | |
|---|---|
| *H04W 36/00* | (2009.01) |
| *H04W 4/00* | (2009.01) |
| *H04W 36/32* | (2009.01) |
| *H04W 36/04* | (2009.01) |

(52) U.S. Cl.
CPC .............. *H04W 36/32* (2013.01); *H04W 36/04* (2013.01)
USPC ......... 455/436; 455/437; 455/441; 455/67.11

(58) Field of Classification Search
USPC .............. 455/525, 422.1, 437, 436, 438, 439, 455/442, 444, 453, 452.1, 449, 441, 443, 455/67.11, 515; 370/235, 338, 331, 334, 370/330, 332
See application file for complete search history.

(56) References Cited

U.S. PATENT DOCUMENTS

| | | | |
|---|---|---|---|
| 2004/0219918 A1* | 11/2004 | Kakishima et al. | ............ 455/436 |
| 2008/0219216 A1* | 9/2008 | Taaghol et al. | ................ 455/436 |

FOREIGN PATENT DOCUMENTS

EP     2 117 250     11/2009

OTHER PUBLICATIONS

International Search Report and Written Opinion dated Nov. 7, 2012.
"LTE; Evolved Universal Terrestrial Radio Access (E-UTRA); Radio Resource Control (RRC); Protocol specification," 3GPP TS 36.331 version 8.17.0 Release 8, Jul. 2012.
"LTE; Evolved Universal Terrestrial Radio Access (E-UTRA); Radio Resource Control (RRC); Protocol specification," 3GPP TS 36.331 version 9.11.0 Release 9, Jul. 2012.
"LTE; Evolved Universal Terrestrial Radio Access (E-UTRA); Radio Resource Control (RRC); Protocol specification," 3GPP TS 36.331 version 10.6.0 Release 10, Jul. 2012.

* cited by examiner

*Primary Examiner* — John J Lee
(74) *Attorney, Agent, or Firm* — Harness, Dickey & Pierce

(57) ABSTRACT

At least one example embodiment discloses a method of controlling a handover of a user equipment (UE) from a serving base station to a target base station in a heterogeneous network. The method includes determining, by a serving base station, a speed of the UE and a type of the handover, the type of the handover being one of macro cell to macro cell, macro cell to small cell, small cell to macro cell and small cell to small cell, and controlling, by the serving base station, the handover from the serving base station to the target base station based on the speed of the UE and the type of handover.

19 Claims, 8 Drawing Sheets

METHODS AND SYSTEMS FOR CONTROLLING HANDOVERS IN A CO-CHANNEL NETWORK

PRIORITY STATEMENT

This application claims the benefit of U.S. Provisional Application No. 61/510,253, filed Jul. 21, 2011, the entire contents of which are incorporated herein by reference.

BACKGROUND

The wireless industry is experiencing increasing growth in data and service traffic. Smart phones and data devices are demanding more and more from wireless networks. To offload the traffic in densely populated areas and increase indoor coverage, small cells (e.g., pico cells) have become a feasible solution. Namely, heterogeneous networks (HetNets) are now being developed, where cells of smaller footprint size are embedded within the coverage area of larger macro cells or at least partially overlapped by the larger macro cells, primarily to provide increased capacity in targeted areas of data traffic concentration. Such heterogeneous networks try to exploit the spatial variations in user (and traffic) distribution to efficiently increase the overall capacity of the wireless network. Those smaller-sized cells are typically referred to as small cells in contrast to the larger and more conventional macro cells.

In Long Term Evolution (LTE), the handover (HO) is optimized for a UE moving from one macro cell to another macro cell.

The existing LTE HO is mainly based on an Event A3 in the 3GPP TS 36.331 standard, the entire contents of which are herein incorporated by reference. Received signal strength (RSRP) is used as a metric for an eNodeB (enhanced NodeB) to make HO decisions. The HO parameters in the current macro cellular network are intended for the macro-to-macro HO. The macro cells have many of the same parameters such as transmit power and coverage area.

For example, for a macro-macro HO, a late HO initiation is used to reduce a ping-pong effect or a number of unnecessary HOs.

SUMMARY

The inventors have discovered that when small cells are overlaid in a co-channel deployment on top of a macro cell, the handover parameters and procedure should be adjusted considering the radio-frequency characteristics of the small cells. When co-channel small cells are deployed with lower transmit powers and thus, smaller coverage areas, several challenges are presented for the mobility performance. Consequently, example embodiments disclose adjusting handover parameters and procedure to take into account radio-frequency characteristics of the small cells. In some example embodiments, the handover parameters are adjusted based on a speed of the user equipment. In some other example embodiments, handover parameters are adjusted or pre-configured based on the handover scenarios including macro-to-small handover, small to macro handover, macro to macro handover and small to small handover.

A factor affecting handover performance in co-channel overlay is co-channel interference. The co-channel interference is quite severe in the HetNets than the conventional macro network. For example, in the normal coverage area around the small cell transmit antenna, interference from the small cell is high for the macro link. Thus, there is a high possibility for the macro radio link failure deep inside the small cell coverage.

An example embodiment discloses a method of controlling a handover of a user equipment (UE) from a serving base station to a target base station. The method includes determining, by a serving base station, a speed of the UE and a type of handover, the type of handover being one of macro cell to macro cell, macro cell to small cell, small cell to macro cell and small cell to small cell, and controlling, by the serving base station, the handover from the serving base station to the target base station based on the speed of the UE and the type of handover.

In an example embodiment, the controlling includes classifying the speed of the UE into one of a low speed, medium speed and high speed.

In an example embodiment, the controlling includes preventing the handover if the speed of the UE is the high speed.

In an example embodiment, the controlling includes scheduling the UE for transmission on almost blank sub-frames (ABS) of the target base station.

In an example embodiment, the controlling includes increasing a time-to-trigger (TTT) handover period if the speed of the UE is the low speed.

In an example embodiment, the controlling includes increasing a handover threshold if the speed of the UE is the low speed and handing over the UE if the handover threshold exceeds a difference between the reference signal received powers (RSRPs) of the target base station and the serving base station at the UE.

In an example embodiment, different TTT values are set differently in different handover scenarios including macro to small, small to macro, macro to macro and small to small handover scenarios. The controlling includes decreasing a time-to-trigger (TTT) handover period if the speed of the UE is the high speed.

In an example embodiment, the controlling includes decreasing a handover threshold if the speed of the UE is the high speed and handing over the UE if the handover threshold exceeds a difference between the reference signal received power (RSRPs) of the target and serving base stations at the UE.

In an example embodiment, the controlling includes increasing a handover threshold if the speed of the UE is the medium speed and handing over the UE if the handover threshold exceeds a difference between the reference signal received power (RSRPs) of the target and serving base stations at the UE.

In an example embodiment, the controlling includes changing a handover threshold based on the speed of the UE and handing over the UE if the handover threshold exceeds a difference between the reference signal received power (RSRPs) of the target and serving base stations at the UE.

In an example embodiment, the controlling includes changing a time-to-trigger (TTT) handover period based on the speed of the UE.

In an example embodiment, the controlling includes adjusting a layer 3 filter 'K' value based on the speed of the UE.

In an example embodiment, the method further includes determining a direction of the UE, and the controlling includes controlling, by the serving base station, the handover from the serving base station to the target base station based on a velocity of the UE, the velocity being the speed and direction of the UE.

In an example embodiment, the controlling includes classifying the speed of the UE into one of a low speed, medium speed and high speed.

In an example embodiment, the controlling includes preventing the handover if the speed of the UE is the high speed.

In an example embodiment, the controlling includes changing a handover threshold based on the velocity of the UE and handing over the UE if the handover threshold exceeds a difference between the reference signal received power (RSRPs) of the target and serving base stations at the UE.

In an example embodiment, the controlling includes changing a time-to-trigger (TTT) handover period based on the velocity of the UE.

In an example embodiment, the controlling includes adjusting a layer 3 filter K value based on the velocity of the UE.

In an example embodiment, the serving base station is associated with a macro cell coverage area and the target base station is associated with a small cell coverage area, the small cell coverage area being within the macro cell coverage area.

In an example embodiment, the serving base station is associated with a macro cell coverage area and the target base station is associated with another macro cell coverage area.

In an example embodiment, the serving base station is associated with a small cell coverage area within a macro cell and the target base station is associated with another small cell coverage area within the macro cell.

In an example embodiment, the serving base station is associated with a small cell coverage area within a macro cell and the target base station is associated with the macro cell.

In an example embodiment, the controlling further includes, changing a handover threshold based on the speed of the UE, the handover threshold being one of a cell specific offset of a cell associated with the target base station, a hysteresis parameter for an event and a system wide common offset parameter for the event.

In an example embodiment, the controlling includes adjusting a layer 3 filter 'K' value based on a type of handover, the type of handover being one of macro cell to macro cell, macro cell to small cell, small cell to macro cell and small cell to small cell.

In an example embodiment, the controlling includes scheduling the UE for transmission on almost blank sub-frames (ABS) of the target base station, and handing over the UE to the target base station.

In an example embodiment, the controlling includes adjusting TTT value based on a type of handover, the type of handover being one of macro cell to macro cell, macro cell to small cell, small cell to macro cell and small cell to small cell.

Another example embodiment discloses a base station configured to determine a speed of the UE in an area associated with the base station and control a handover from the base station to a target base station based on the speed of the UE and a type of the handover, the type of the handover being one of macro cell to macro cell, macro cell to small cell, small cell to macro cell and small cell to small cell.

Another example embodiment discloses a user equipment (UE) configured to perform handover measurements regarding a handover from a serving macro cell to a target small cell based on a velocity of the UE relative to the target small cell.

BRIEF DESCRIPTION OF THE DRAWINGS

Example embodiments will be more clearly understood from the following detailed description taken in conjunction with the accompanying drawings. FIGS. 1-7B represent non-limiting, example embodiments as described herein.

FIG. 1 illustrates a wireless communication system according to an example embodiment;

FIG. 2 illustrates a macro cell and small cell RSRP profile and a conventional handover timeline;

FIG. 3 illustrates the macro cell of FIG. 1;

FIG. 7B illustrates an example embodiment of a base station shown in FIG. 1.

DETAILED DESCRIPTION

Figure 1:
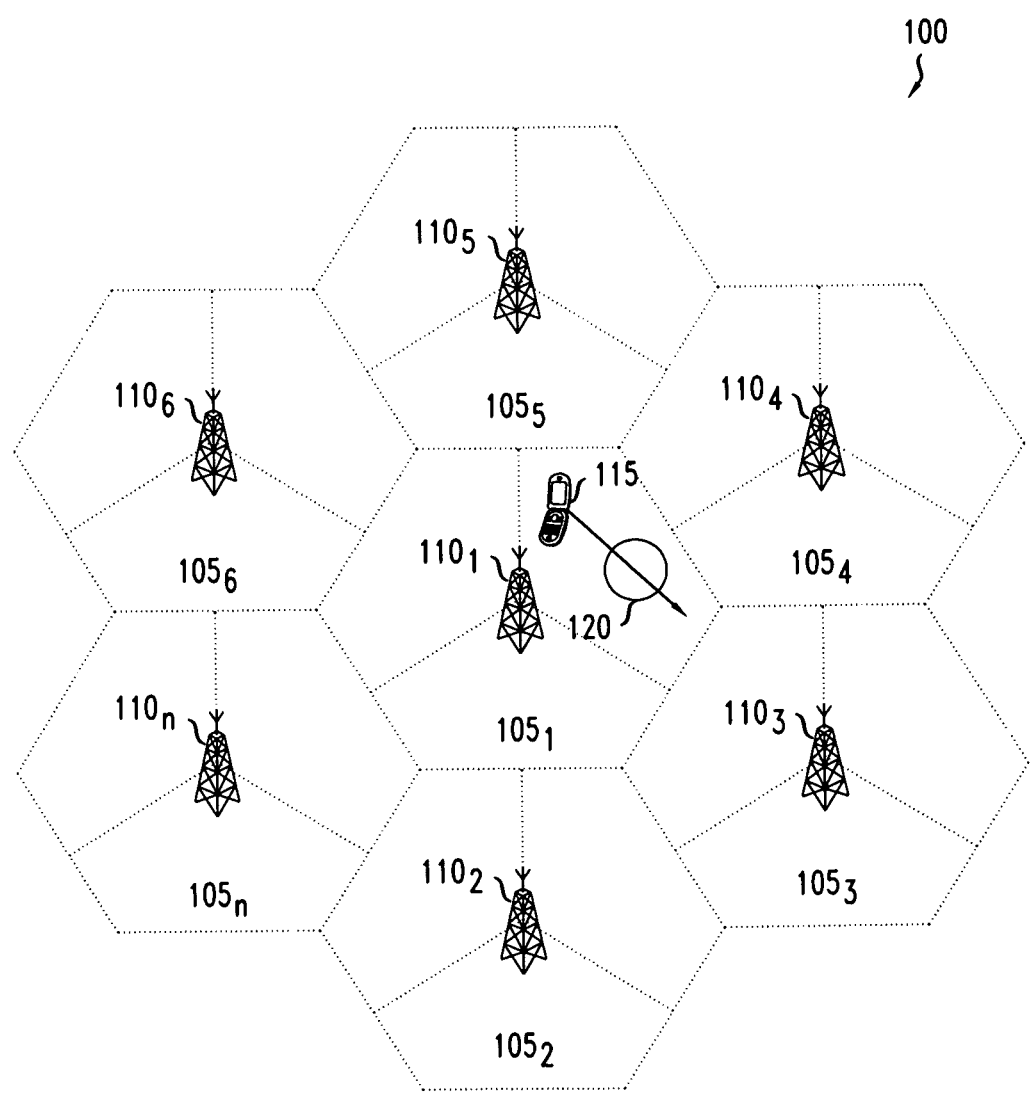

Various example embodiments will now be described more fully with reference to the accompanying drawings in which some example embodiments are illustrated.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the claims. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of example embodiments and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the following description, illustrative embodiments will be described with reference to acts and symbolic representations of operations (e.g., in the form of flowcharts) that may be implemented as program modules or functional processes including routines, programs, objects, components, data structures, etc., that perform particular tasks or implement particular abstract data types and may be implemented using existing hardware at existing network elements or control nodes. Such existing hardware may include one or more Central Processing Units (CPUs), digital signal processors (DSPs), application-specific-integrated-circuits, field programmable gate arrays (FPGAs) computers or the like.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

As disclosed herein, the term "storage medium", "storage unit" or "computer readable storage medium" may represent one or more devices for storing data, including read only memory (ROM), random access memory (RAM), magnetic RAM, core memory, magnetic disk storage mediums, optical storage mediums, flash memory devices and/or other tangible machine readable mediums for storing information. The term "computer-readable medium" may include, but is not limited to, portable or fixed storage devices, optical storage devices, and various other mediums capable of storing, containing or carrying instruction(s) and/or data.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a computer readable storage medium. When implemented in software, a processor or processors will perform the necessary tasks.

A code segment may represent a procedure, function, subprogram, program, routine, subroutine, module, software package, class, or any combination of instructions, data structures or program statements. A code segment may be coupled to another code segment or a hardware circuit by passing and/or receiving information, data, arguments, parameters or memory contents. Information, arguments, parameters, data, etc. may be passed, forwarded, or transmitted via any suitable means including memory sharing, message passing, token passing, network transmission, etc.

As used herein, the term "user equipment" or "UE" may be synonymous to a user equipment, mobile station, mobile user, access terminal, mobile terminal, user, subscriber, wireless terminal, terminal and/or remote station and may describe a remote user of wireless resources in a wireless communication network. Accordingly, a UE may be a wireless phone, wireless equipped laptop, wireless equipped appliance, etc.

The term "base station" may be understood as a one or more cell sites, base stations, nodeBs, enhanced NodeBs, access points, and/or any terminus of radio frequency communication. Although current network architectures may consider a distinction between mobile/user devices and access points/cell sites, the example embodiments described hereafter may also generally be applicable to architectures where that distinction is not so clear, such as ad hoc and/or mesh network architectures, for example.

Communication from the base station to the UE is typically called downlink or forward link communication. Communication from the UE to the base station is typically called uplink or reverse link communication.

Serving base station may refer to the base station currently handling communication needs of the UE.

FIG. 1 illustrates a wireless communication system according to an example embodiment. Referring to FIG. 1, the wireless communication system includes a heterogeneous network 100 (HetNet), where cells of smaller footprint size (e.g., femto cells) are embedded within the coverage area of a larger macro cell (e.g., the area served by a macro base station) or at least partially overlapped by the larger macro cell. As used herein, the terminology "cell" refers to the coverage area as well as the base station serving the coverage area. It will be understood that each cell has an associated base station.

As shown, a plurality of macro cells $105_1$-$105_n$ are arranged in a hexagonal grid of cells. ENodeBs $110_1$-$110_n$ serve the plurality of macro cells $105_1$-$105_n$, respectively. A user equipment (UE) 115 within the cell $105_1$ may communicate with the eNodeB $110_1$. Since the UE 115 is within the macro cell $105_1$, the eNodeB $110_1$ may be referred to as a serving base station.

The eNodeB $110_1$ communicates with the UE 115 (and vice versa) via at least one air interface that supports transmission of data between the eNodeB $110_1$ and the UE 115. Techniques for establishing, maintaining, and operating the air interfaces between the UE 115 and the eNodeB $110_1$ to provide uplink and/or downlink wireless communication channels between the UE 115 and the eNodeB 110₁ are known in the art and in the interest of clarity only those aspects of establishing, maintaining, and operating the air interfaces that are relevant to the present disclosure will be discussed herein.

Small cells may be overlaid in each of the macro cells 105₁-105ₙ. Example embodiments encompass any number and type of small cell. For example, the phrase "small cell" may refer to any relatively small cell or access point, such as a femto cell, femto access point (or base station), pico cell, pico access point (or base station), micro cell, micro access point (or base station), metro cell, metro access point (or base station) nano cell, nano access point (or base station), etc.

For purposes of illustration, a small cell 120 is embedded in the coverage area of the macro cell 105₁. The small cell 120 may be a pico cell or femto cell. However, small cells are not limited to being femto or pico cells.

Moreover, the UE 115 is travelling at a speed towards the small cell 120.

The network 100 is an LTE network. However, it should be understood that example embodiments described herein may be performed in accordance with System for Mobile Communications (GSM), General Packet Radio Service (GPRS), Universal Mobile Telecommunications System (UMTS), High-Speed Downlink Packet Access (HSDPA), and/or High-Speed Uplink Packet Access (HSUPA) cellular standards.

Figure 2:
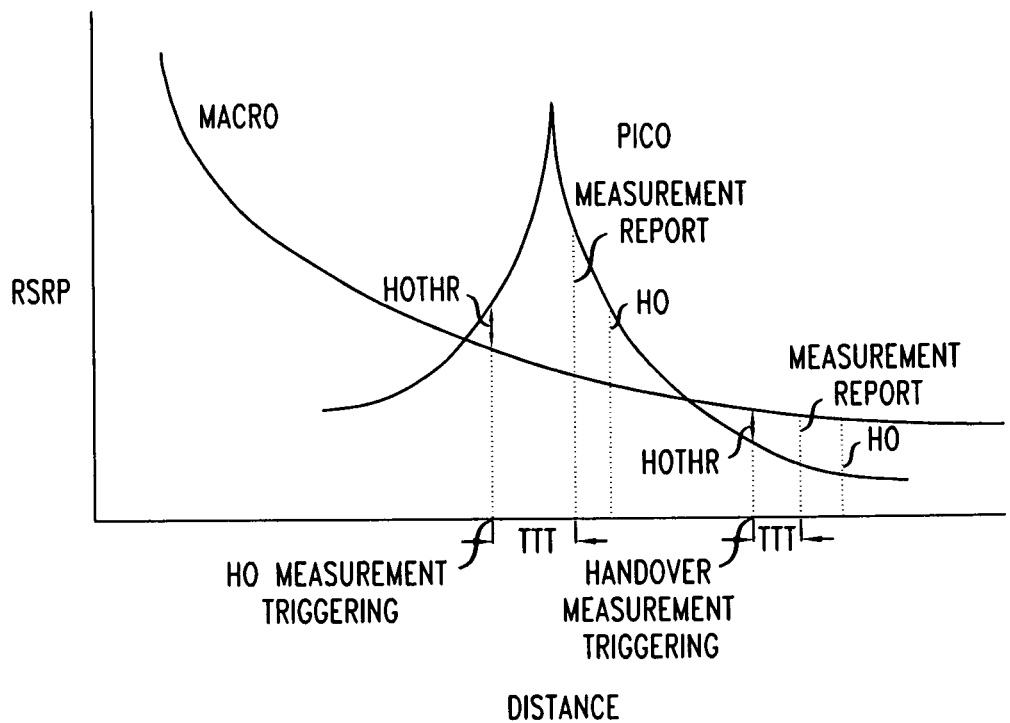

FIG. 2 illustrates a macro cell and small cell RSRP profile and a conventional handover (HO) timeline. The network 100 is configured to perform the conventional HO timeline shown in FIG. 2. While RSRP is illustrated, it should be understood that reference signal received quality (RSRQ) may be used interchangeably with RSRP.

As shown in FIG. 2, the RSRP of a macro cell decreases the farther a UE moves away of an eNodeB. At a certain distance between the eNodeB and a transmitting antenna of the small cell, the RSRP from the small cell becomes greater than the RSRP of the macro. When the RSRP from the small cell is greater than the RSRP of the macro cell by a HO threshold HOTHR, the eNodeB triggers the HO process. The HO threshold HOTHR may be determined based on empirical data. For example, the HO threshold HOTHR is varied and the HO performance is monitored to choose the actual value. The HO threshold HOTHR may be based on HO failure rate and ping-pong, as well as other factors such as cell coverage range.

In LTE, an event A3 occurs when a measurement metric, such as RSRP, from a neighbor cell (e.g., small cell) becomes greater than the RSRP measurement from the serving cell (e.g., macro cell). Event A3 HO measurement report triggering is specified in 3GPP TS 36.331. While example embodiments discuss HOs related to 3GPP TS 36.331, it should be understood that example embodiments should not be limited thereto and may be implemented in HOs specified in TS 36.300 and other types of HOs. Moreover, while example embodiments discuss HOs related to event A3, it should be understood that example embodiments should not be limited thereto and example embodiments may be implemented in other event scenarios, such as event A4 and event A5.

In TS 36.331, handover procedures are started when:

$$Mn+Ofn+Ocn-Hys>Ms+Ofs+Ocs+Off \quad (1)$$

wherein Ocn is the cell specific offset of the neighbor cell, and set to zero if not configured for the neighbor cell, Ocs is the cell specific offset of the serving cell and is set to zero if not configured for the serving cell, Hys is the hysteresis parameter for the event (0, 0.5 . . . 15 dB) and Off is the system wide common offset parameter for this event. Mn, Ms are expressed in dBm in case of RSRP, for the neighbor cell and the serving cell, respectively, or in dB in case of reference signal received quality (RSRQ). The other handover parameters in the equation are expressed in dB.

Event A3 occurs and the HO process starts when equation (1) is met. HO measurement is made by the UE and then reported to the serving base station.

In TS 36.331, handover procedures end when:

$$Mn+Ofn+Ocn+Hys<Ms+Ofs+Ocs+Off \quad (2)$$

The HO process ends between two cells when equation (2) is satisfied.

Equation (1) can be simplified to:

$$Mn>Ms+HOTHR \quad (3)$$

wherein Mn is the measurement result (e.g., RSRP or RSRQ) of the neighboring cell, not taking into account any offsets, Ms is the measurement result of the serving cell, not taking into account any offsets, and HOTHR is a handover threshold. The handover threshold HOTHR is one of parameters Ocn, Hys, Off, Ocs or a combination of any of the parameters Ocn, Hys, Off and Ocs, which are defined in the LTE standard.

Referring to FIG. 2, the triggering handover process from the small cell to the macro cell occurs when the RSRP from the macro cell is greater than the RSRP of the small cell by the HO threshold HOTHR.

The serving base station is configured to determine the parameters Mn, Ms, Ofn, Ocn, Ofs, Ocs, Hys and Off based on known communications methods or control signaling with the UE. Thus, for the sake of brevity and clarity no further description will be provided.

When the UE moves toward a target cell such as the small cell or another macro cell and the target cell satisfies the entering condition (1), the target cell is included in a neighbor list for the HO.

When the UE moves away from the target cell and the leaving condition (2) is satisfied that target cell is removed from the neighbor list for the HO.

Management of neighbor lists is well known and therefore, will not be described for the sake of brevity.

For conventional co-channel macro-to-macro HO, the parameters Ofn, Ocn, Ofs and Ocs are set to zero. The parameter Hys is a positive quantity and used to prevent ping-ponging and unnecessary HOs. The parameter Off may be the HO threshold HOTHR and generally is a positive quantity and common for all target cells.

The UE measures RSRPs at a physical (PHY) layer (Layer 1) and periodically measured RSRPs are passed through an infinite impulse response (IIR) filter at layer 3 of the UE to remove the variations due to multipath fading and make the accurate HO decisions. In standard TS 36.331, the IIR filter is denoted as $$Fn=(1-a)Fn-1+a\,Mn \quad (4)$$

where $$a=\tfrac{1}{2}^{\wedge}(K/4) \quad (5)$$

Fn−1 and Fn are the previous and current filtered RSRP values, respectively.

In TS 36.331, the layer 1 sampling rate is implementation specific and the layer 3 filtering sampling rate is 200 ms.

Referring to FIG. 2, when the small cell RSRP is greater than the macro cell RSRP plus the handover threshold HOTHR, the serving base station decides the UE should be handed over to the small cells. LTE includes mechanisms to reduce the unnecessary HOs. These include Time-to-trigger (TTT), HO thresholds or margins, and layer 3 filtering.

When the RSRP profiles cross each other, the serving base station considers the HO threshold HOTHR before initiating the handoff. The HO threshold HOTHR prevents unnecessary HOs due to shadowing and fading.

The HO is initiated when the UE determines that RSRP of the small cell exceeds the RSRP of the serving base station by the HO threshold HOTHR. The UE makes the RSRP measurement and initiates the TTT. When the TTT expires, the UE sends the measurement report to the serving base station.

The TTT also prevents unnecessary back and forth HOs. However, when the small cells with smaller geographical coverage areas are present, a late HO and larger TTT may cause the current serving cell to experience radio link failure (RLF) in the downlink. If the UE is moving towards/through the small cell, a HO may not occur until the UE is deep into the small cell.

When the UE is deep into the small cell, the interference from the small cell may cause the macro downlink RLF before the HO is completed. Similarly, for the case when the UE is moving out of the small cell, the late HO and larger TTT may cause the small cell downlink RLF.

The connected mode HO process is also affected by the radio link monitoring and failure process (RLM, RLF). Connected mode means active data transmission takes place between an eNodeB and UE. Idle mode means the UE is on but no data transmission takes place and only periodic control channels are transmitted between the eNB and UE. In example embodiments described herein, the HO process is during the connected mode.

The UE continues to monitor the radio link quality. Generally, the UE checks whether a wideband channel quality indicator (CQI) for communications with the serving base station goes below a threshold Qout, every 200 ms. If CQI goes below the threshold Qout, then the UE starts an RLF timer (T310). When the RLF timer is running, the UE determines every 100 ms if the wideband CQI goes above a threshold Qin. If the CQI goes above Qin, the RLF timer is stopped and the radio link is recovered. Otherwise, when the RLF timer is expired, RLF is declared by the UE. If the RLF timer is running when the TTT expires the RLF timer would also be reset.

When the UE receives the HO measurement request, the UE measures the RSRP periodically for e.g., every 40 ms. The serving base station can request a measurement report or the UE can send a measurement report without a request from the serving base station.

After the layer 3 RSRP filtering, the HO process is initiated if $$RSRP_{Small} > RSRP_{Macro} + HOTHR \quad (6)$$

for the macro-to-small HO, where $RSRP_{Small}$ is the measured RSRP of the small cell and $RSRP_{Macro}$ is the measured RSRP of the macro cell. In other words, the Event A3 entering condition is satisfied. Once the HO process is initiated, the serving base station starts the TTT.

The UE continues to measure the RSRPs and wideband CQI during the TTT period. Then, the UE sends the measurement report to the serving base station and the serving base station sends the HO command to the UE after the serving base station processes the measurement report.

There are at least three possible scenarios for HO failure:
1. When the TTT timer is running, the RLF timer may expire. In this situation, the serving cell RLF occurred before HO.
2. When the TTT timer expires the RLF timer is not expired but is reset. In this situation, the serving cell DL control channel failure occurred (PDCCH) and results in HO failure.
3. When the TTT expires and the UE receives the HO command successfully. Then, the UE tries to connect to the target cell and random access failure may occur (random access message 2 failure), leading to HO failure.

Example embodiments reduce the amount of HO failures by adjusting HO parameters based on speed and/or velocity of the UE, and using the speed/velocity to reduce HO failures.

Figure 3:
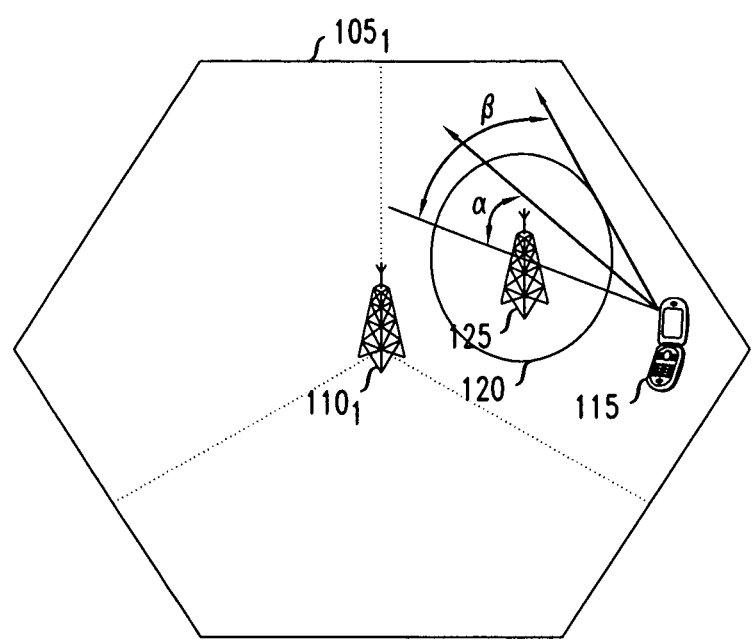

FIG. 3 illustrates the macro cell $105_1$, shown in FIG. 1. As shown, an antenna 125 provides communications to equipment within the small cell 120.

Both the base station $110_1$ and the antenna 125 are configured to determine a speed and/or velocity of the UE 115. The antenna 125 may be a pico cell base station, femto base station or any other type of small cell base station. As is known in LTE, the UE or serving base station estimates in the speed of the UE based on the number of cells a UE was handed over within a period of time. Other methods are also known. UE based methods are called Mobility state estimation, which is specified in standards. The serving base station could also count and maintain the accumulated number of HOs to estimate the UE speed. Other known methods of determining a speed of a UE may be used.

Figure 4A:
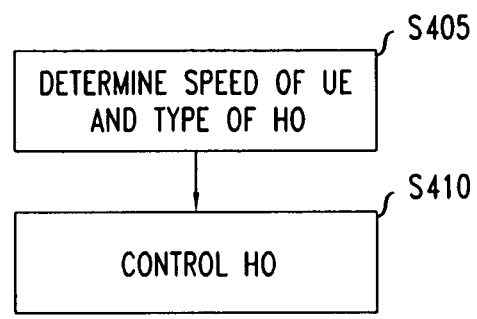
FIG. 4A illustrates a method of controlling a handover of a UE from a serving base station to a target base station according to an example embodiment.

FIG. 4A illustrates a method of controlling a HO of a UE from a serving base station to a target base station according to an example embodiment. While the method shown in FIG. 4A is directed to a macro-small cell HO, it should be understood that the method of FIG. 4A may be implemented in macro-macro, small-small and small-macro HOs. Moreover, the HO parameters such as the HO threshold, TTT and K value may be adjusted based on the speed (or velocity) and the type of HO (e.g., macro-macro, macro-small, small-macro, small-small). It should be understood that the serving base station may be the eNodeB $110_1$ and the target base station may be the antenna 125. Thus, the UE is in the macro cell coverage area and in communication with the serving base station.

In one example embodiment, the serving base station uses the parameter Ocn as the HO threshold. With parameter Ocn, different HO thresholds could be set depending on the HO scenario.

In TS 36.331, the layer 3 filtering sampling rate is 200 ms. However, the inventors have discovered that the 200 ms sampling rate affects the HO performance. Thus, in at least one example embodiment, the serving base station uses a faster layer 1 to layer 3 sampling period (for example 40 ms, 50 ms or 100 ms).

Moreover, a lower K value (for example K=0, 1 or 2) is used by the base station when small cells exist. Additionally, different K values are used depending on the type of HO, such as macro to macro, macro to small, small to macro and small to small. The Layer 3 filter averages out the multipath fading effects on the RSRP. The K value in equation (4) is an indication for the duration of the averaging. A smaller K value means the averaging is done during a short period of time. Different K values are determined by the network for different handover scenarios, respectively, based on empirical data.

Similar to the HO threshold HOTHR, the initial TTT time and initial K value are set based on empirical data. Operators test the network and determine the HO threshold HOTHR, the initial TTT time and initial K value for certain scenarios/operating conditions. The initial values of the UEs are set using dedicated control messages or a broadcast message.

As shown in FIG. 4A, the serving base station determines a speed/velocity of the UE and type of HO at S405. The type of handover is one of macro cell to macro cell, macro cell to small cell, small cell to macro cell and small cell to small cell. The serving base station decides whether to hand over the UE to another cell. The HO measurements may be based on RSRP. Cell IDs allocated for the macro cells and small cells are known to the base stations. From the cell ID of the target base station, the serving base station determines the type of HO.

At S410, the serving base station controls the HO based on the speed of the UE. As the HO threshold is adjusted based on the speed of the UE, the entering condition (1) for Event A3 continuously changes.

Figure 4B:
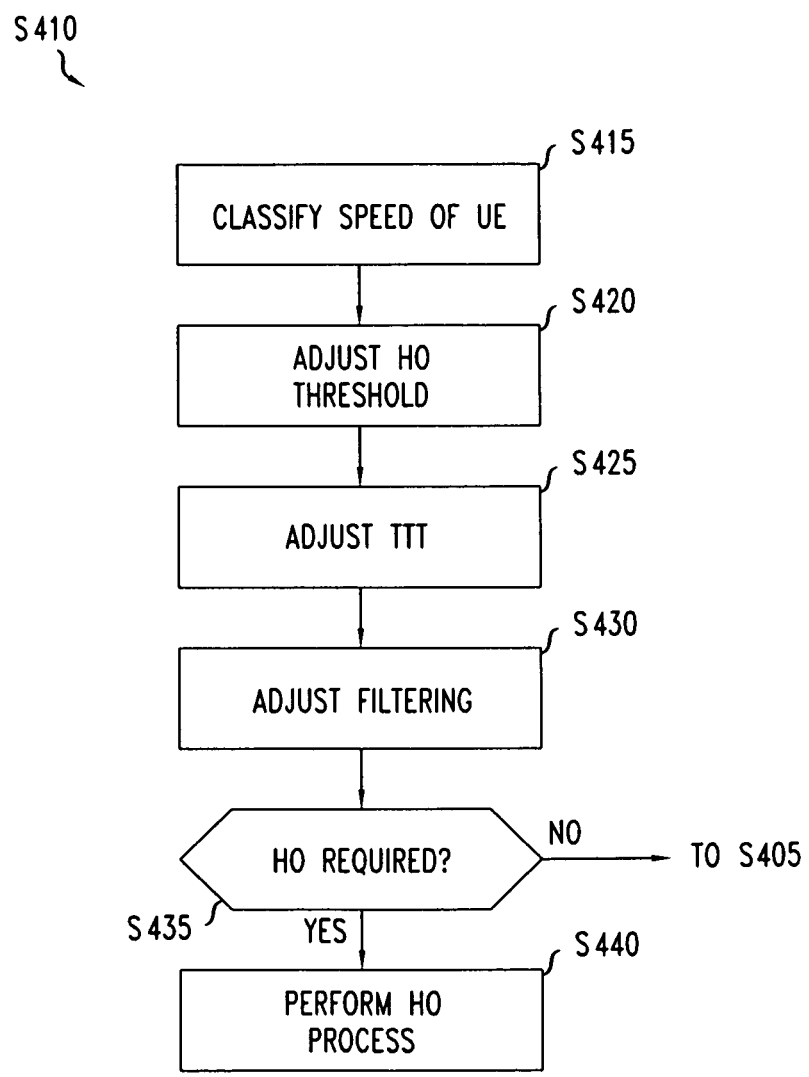
FIG. 4B illustrates a method of controlling the handover based on the speed of the UE.

FIG. 4B illustrates S410 in more detail according to an example embodiment.

At S415, the serving base station classifies the speed of the UE. For example, the serving base station classifies the speed into one of a low speed, medium speed and high speed. As an example, a low speed may be less than 40 kmph, a medium speed may be 40-60 kmph and a high speed may be greater than 60 kmph.

Based on the classified speed and the type of the HO, the serving base station adjusts the HO threshold at S420. In one example embodiment, the HO threshold for high speed UEs is set so that all HOs to the small cells are blocked. In another example embodiment, the HO threshold for the high speed UE is lowered to trigger a quicker HO. For the low speed UEs which are allowed to HO to the small cells, the HO threshold is increased and is realitvely higher than the HO threshold for medium speed UEs and the HO threshold for high speed UEs that are permitted to HO to the small cells. The HO threshold may be Ocn, HYS, Off or a combination thereof.

In a further example embodiment, the HO threshold is scaled based on the speed of the UE. For example, the HO threshold may be scaled by 0.25 for high speed, 0.75 for medium speed and 1 for low speed.

Referring back to FIG. 4B, the TTT is then adjusted by the serving base station based on the speed classification at S425. In an example embodiment, the TTT for the high speed UE is lowered to trigger a quicker HO. For the low speed UEs which are allowed to HO to the small cells, the TTT is increased and is realitvely higher than the TTTs for medium and high speed UEs.

In a further example embodiment, the TTT is scaled based on the speed of the UE. For example, the TTT may be scaled by 0.25 for high speed, 0.75 for medium speed and 1 for low speed.

At S430, the serving base station adjusts the K value based on the speed classification and the type of the HO. As discussed above, different K values are determined by the network for different handover types, respectively, based on empirical data. In an example embodiment, the K value for the high speed UE is lowered. For the low speed UEs which are allowed to HO to the small cells, the K value is increased and is relatively higher than the K values for medium and high speed UEs.

In other words, for faster moving UEs, more responsive filtering is performed to support quicker HO decisions. Higher UE speeds use a lower L1 filtering time (which is L1 to L3 reporting time). Higher UE speeds also use a smaller K value of the L3 filter.

At S435, the UE determines whether a HO should proceed based on the adjusted HO threshold, TTT and K values. More specifically, after the RSRP (or RSRQ) measurement exceeds the HO threshold, the UE triggers the TTT, and the UE transmits a measurement report to the serving base station once the TTT expires is triggered, after waiting for TTT. The UE then receives an HO command from the target cell at S440.

If the serving base station determines that a HO is not required, the method proceeds to S405. It should be also be understood that the serving base station may continuously monitor HO situations while adjusting HO parameters.

The UE speed dependent HO configuration change could be realized by 1) the network detecting the UE speed and based on the speed, the network sending a reconfiguration unicast message to the UE; and 2) the UE estimating its own speed and, based on the estimation results, adjusting the HO configuration parameters by itself. The unicast message carries the values of the HO parameters. The network may broadcast related information to assist this activity. This approach could be used for not only UEs in CONNECTED mode but also UEs in IDLE mode.

It should be understood that the steps may be implemented in various order and are not limited to the order shown in FIG. 4B.

In another example embodiment, the serving base station makes the HO decision based on the UE's velocity, which includes the speed and direction. It should be understood that the HO parameters may adjusted in the manner described in FIG. 4B.

Multiple location estimations of the UE in a given period of time could be used for UE speed and moving direction estimation. The serving base station makes the HO decision based on the speed and the relative angle of the moving UE. For example, the serving base station may implement the following:

(1) If the speed is very high, do not HO to the small cell.
(2) If the speed is medium, allow the HO to the small cell if the angle is less than or equal to $\alpha$ (shown in FIG. 3). Otherwise, do not allow the HO.
(3) If the speed is low, allow the HO to the small cell if the angle is less than or equal to $\beta$ (shown in FIG. 3). Otherwise, do not allow the HO.

The angles $\alpha$ and $\beta$ may be determined based on empirical data.

In another example embodiment, the UE decides whether to search a neighboring small cell for HO. For example, the UE decides whether to perform the measurement of the neighboring small cell based on the following logic similar to the HO decision:

(1) If the speed is very high, no search of the neighboring small cell is needed.
(2) If the speed is medium and the angle is less than or equal to $\alpha$, small cell measurement is performed to search the small cell. Otherwise, no small cell measurement is performed
(3) If the speed is low and the angle is less than or equal to $\beta$, allow small cell measurement. Otherwise, no measurement for the small cell is performed.

Moreover, while speeds are classified in FIG. 4B, it should be understood that HO parameters may be adjusted based on the speed of the UE without a classification.

Figure 5A:
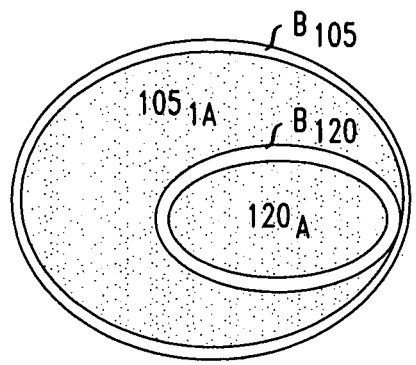
FIGS. 5A-5C illustrate a method of using Almost Blank Sub-frames (ABS) to reduce the amount of handovers according to an example embodiment.
Figure 5B:
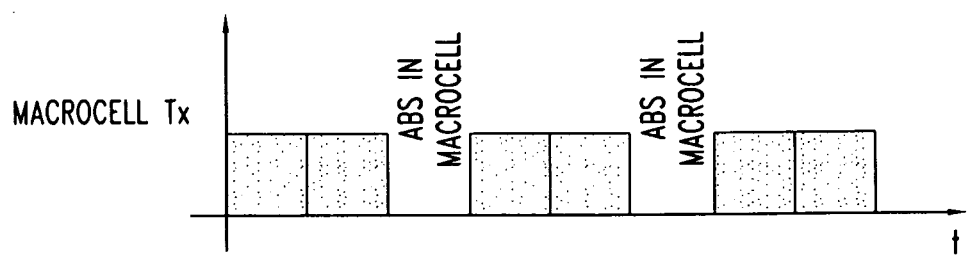

FIGS. 5A-5B illustrate a method of using Almost Blank Sub-frames (ABS) to reduce the amount of handover failures according to an example embodiment.

As shown in FIG. 5A, a macro cell $105_{1A}$ includes a cell border $B_{105}$ and a small cell $120_A$ includes a border $B_{120}$. It should be understood that the macro cell $105_{1A}$ and the small cell $120_A$ may be the same as the macro cell $105_1$ and the small cell $120_1$. Thus, the discussion of FIG. 5A will discuss features not previously discussed.

The border between the macro cell $105_{1A}$ and the small cell $120_A$ is in terms of the relative power measurement at the coverage area. If at a certain coverage area, the measured power from the macro cell $105_{1A}$ and the small cell $120_A$ are the same or close, the coverage area is at the border of to two cells. The macro cell $105_{1A}$ and the small cell $120_A$ configure the UEs to determine the boarder border $B_{120}$ based on the measured powers received from the he macro cell $105_{1A}$ and the small cell $120_A$.

The method of FIGS. 5A-5B use inter-cell interference coordination, as described in the 3GPP Release 8 and 9 Inter-Cell Interference Coordination (ICIC) and Release-10 (enhanced Inter-Cell Interference Coordination (eICIC), the entire contents of which are incorporated by reference.

As known, ICIC reduces inter-cell interferences by radio resource management (RRM) methods. ICIC is a multi-cell RRM function that takes into account information (e.g., the resource usage status and traffic load situation) from multiple cells.

eICIC is an enhancement of the inter-cell interference coordination that effectively extends the ICIC to DL control in the time domain. This requires synchronization at least between a macro eNodeB and the lower power eNodeB's in its coverage. eICIC is realized by means of 3GPP Release Releases 8 and 9 (Multicast Broadcasts on a Single Frequency Network) or Release 10 Almost Blank Sub-frames (ABS).

In one example embodiment, the macro cell eNodeB ($110_1$) uses MBSFN to provide interference management for macro cell and small cell mobility. The macro cell eNodeB reduces high interference by 'muting' in near-blank sub-frames configured by operations and management. The use of OAM is known and, therefore, will not be described for the sake of brevity.

The small cell (125) knows which macro sub-frames are near-blank and transmits in these sub-frames for the UEs in the border.

In a radio frame configuration, e.g., for frequency division duplex (FDD), sub-frames 1, 2, 3, 6, 7, 8, are available for MBSFN. MBSFN (for near-blank sub-frames) reduce downlink interferences.

MBSFN for eICIC impacts a downlink layer 2 scheduler only. The layer 2 downlink scheduler is mute and layer 2 ensures the configuration of the MBSFN sub-frames.

There are two types of ABS sub-frames: MBSFN ABS (in releases 8 and 9) sub-frames and non-MBSFN ABS sub-frames (available in release 10 and after). In MBSFN sub-frames, only the data is not transmitted (entire control signal is transmitted). In non-MBSFN sub-frames control is transmitted on only on first subframe. The blanking information is shared between macro cell and small cells via X2.

The network decides which and how many sub-frames to be blanked. The blanking of a sub-frame is determined based on the based on the control information it carries. The network notifies the small cell the ABS pattern of the umbrella macro cell. The information is delivered to the UE covered by the small cell. In general, these area details of eICIC and known art.

Figure 5C:
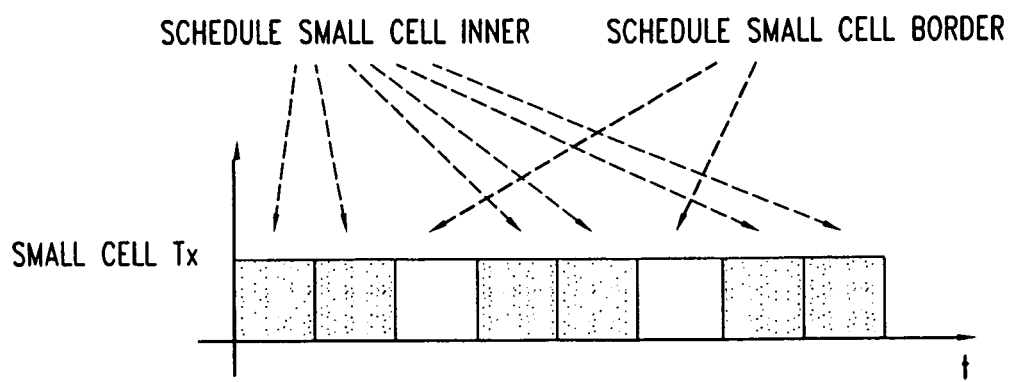

FIGS. 5B-5C illustrate a method of using ABS.

As shown in FIG. 5B, eight sub-frames are shown. ABS's are created in the macro cell and the macro cell does not use ABS for data transmission. In FIG. 5B, the macro cell uses sub-frames 1, 2, 4, 5, 7 and 8 for data transmission. The ABS's are located in sub-frames 3 and 6. A base station (eNodeB) scheduler decides the ABS's based on the load and mobility of the UEs around the coverage area related to the small cell and the macro cell. Only pilots and broadcast signals are transmitted by the macro cell during an ABS.

As shown in FIG. 5C, the antenna 125 schedules its cell border mobiles during the ABS of the macro cell. More specifically, the antenna 125 transmits information to the UEs in the border B120 during the ABS's. The antenna 125 may know a UE is within the border B120 based on the HO measurement report or CQI report from the UE. The antenna 125 knows whether the UE is at the border B120 and whether it should be handed over to the macro cell. Additionally, if a UE is just handed over to the small cell, that UE is at the edge of the small cell. The small cell may use information to decide whether a UE is still at the border such as UL received signal strength or UL CQI or DL CQI.

By scheduling transmission to border UEs during the ABS's, the small cell reduces interference from the macro cell and UE may not experience RLF.

As described above, macro cell sub-frame blanking mitigates macro/small cell interferences.

In another example embodiment small cells transmit to the UEs at the border in the blanked sub-frames of the umbrella macro and transmit to the other in-cell UEs in all sub-frames.

Figure 6A:
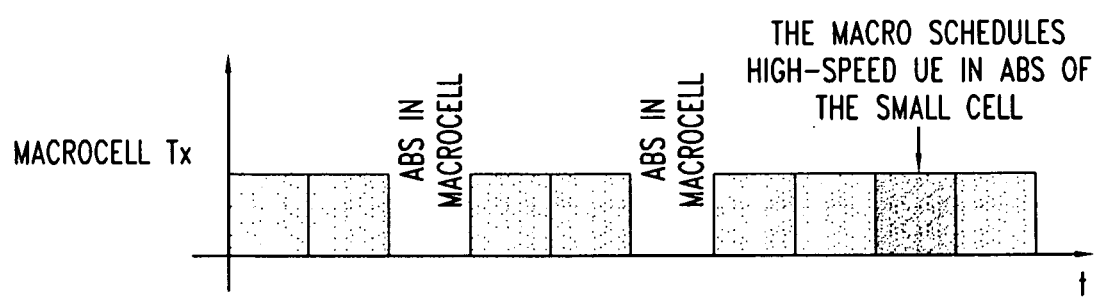
FIGS. 6A-6B illustrate another example embodiment of a method of using Almost Blank Sub-frames (ABS) to reduce the amount of handovers.
Figure 6B:
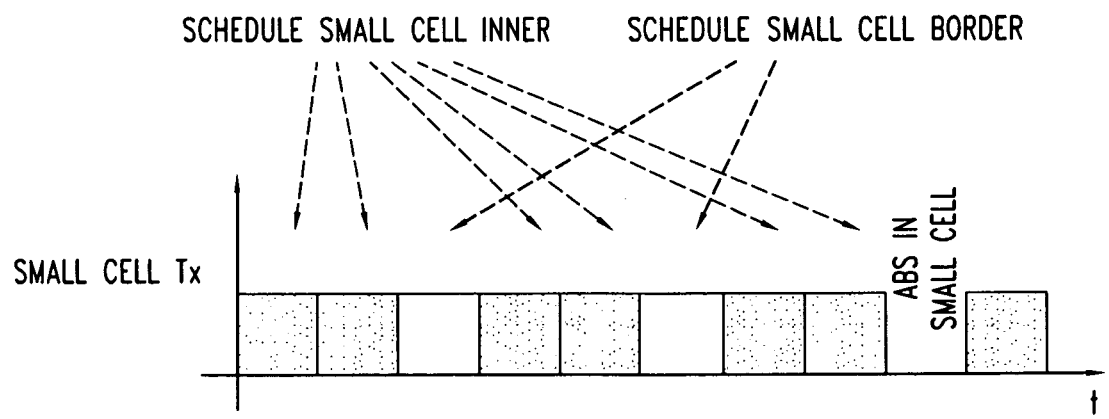

FIGS. 6A-6B illustrate another example embodiment of a method of using Almost Blank Sub-frames (ABS) to reduce the amount of handovers. The method of FIGS. 6A-6B achieves fast hand-in and hand-out of low and medium speed UE's and keeps high speed users on the macro cell. The serving base station is configured to determine the speed of the UE and classify the speed of the UE, as described in FIGS. 4A-4B.

In the method of FIGS. 6A-6B, the serving base station keeps high speed UEs on the macro cell by scheduling the high speed UEs on the interference-free macro cell sub frames that are blanked at the small cell. As shown in FIG. 6B, the small cell has an ABS in sub-frame 9. Therefore, the macro cell schedules transmission for the high speed UEs during sub-frame 9. The ABS pattern of the small cell is also delivered to the macro cell by X2.

The base station scheduler may also rely on an observed difference in channel quality indicator (CQI) reported by the UE over the interference-free subframe (the ABS sub frame of the small cell) versus the remaining frames. If the base station scheduler gets the CQIs values every sub-frame, the scheduler can determine which sub-frames are blanked in the small cell because the CQI values will be higher in blanked sub-frames of the small cells.

For medium and low speed UE's, the macro cell schedules measurements and sends RRC handover commands over the interference-free sub-frames, i.e., corresponding to the almost blank sub-frames at the metro cell.

A UE's signal to interference plus noise ratio (SINR) at the macro cell is acceptable within range of a small cell coverage area because the UE communicates with the macro cell in the ABS sub-frames and may not experience RLF.

Another example embodiment discloses early hand-in or handover of a UE to a small cell and late hand-out from the small cell. Macro cell sub-frame blanking could reduce the small cell interferences during HO in eICIC operation with the cell selection bias towards the small cells. The cell selection bias towards the small cells, results in larger small cell coverage area. As a result, the early hand-in to the small cells and late hand-out from the small cells occur. For early hand-in or handover of a UE to a small cell, the serving base station determines that the target small cell power strength is still too weak just after the handover. Therefore, the small cell base station schedules transmission on the ABS of the macro cell to avoid the interference from the macro cell to UE. For a macro to small HO, the early HO is initiated with a negative HO threshold and for small to macro HO positive HO threshold would initiate the late HO. For late handover or hand-out of a UE to a macro cell, the serving small cell base station determines that its power strength is too weak due to the large positive HO threshold just before the handover. Therefore, to handover from the small cell to the macro cell, the small cell base station schedules transmission on the ABS of the umbrella macro cell to avoid the interference from the macro cell to the small cell (serving cell) before the HO taking place.

Figure 7A:
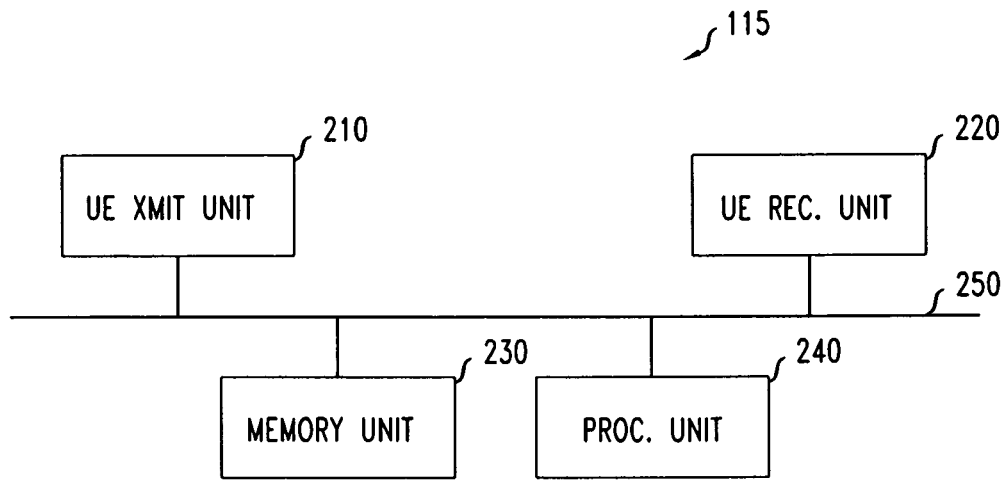
FIG. 7A illustrates an example embodiment of a UE shown in FIG. 1.

FIG. 7A illustrates an example embodiment of the UE 115. It should be also understood that the UE 115 may include features not shown in FIG. 2A and should not be limited to those features that are shown.

The UE 115 is configured to determine speed and direction information relative to the small cell 120 and determine whether to HO to the small cell 120.

The UE 115 may include, for example, a transmitting unit 210, a UE receiving unit 220, a memory unit 230, a processing unit 240, and a data bus 250.

The transmitting unit 210, UE receiving unit 220, memory unit 230, and processing unit 240 may send data to and/or receive data from one another using the data bus 250. The transmitting unit 210 is a device that includes hardware and any necessary software for transmitting wireless signals on the uplink (reverse link) including, for example, data signals, control signals, and signal strength/quality information via one or more wireless connections to other wireless devices (e.g., base stations).

The UE receiving unit 220 is a device that includes hardware and any necessary software for receiving wireless signals on the downlink (forward link) channel including, for example, data signals, control signals, and signal strength/ quality information via one or more wireless connections from other wireless devices (e.g., base stations). The UE receiving unit 220 receives information from the serving base station 110₁ and the antenna 125.

The memory unit 230 may be any storage medium capable of storing data including magnetic storage, flash storage, etc.

The processing unit 240 may be any device capable of processing data including, for example, a microprocessor configured to carry out specific operations based on input data, or capable of executing instructions included in computer readable code. The processing unit 240 may determine reception parameters based on the transmission parameters.

Figure 7B:
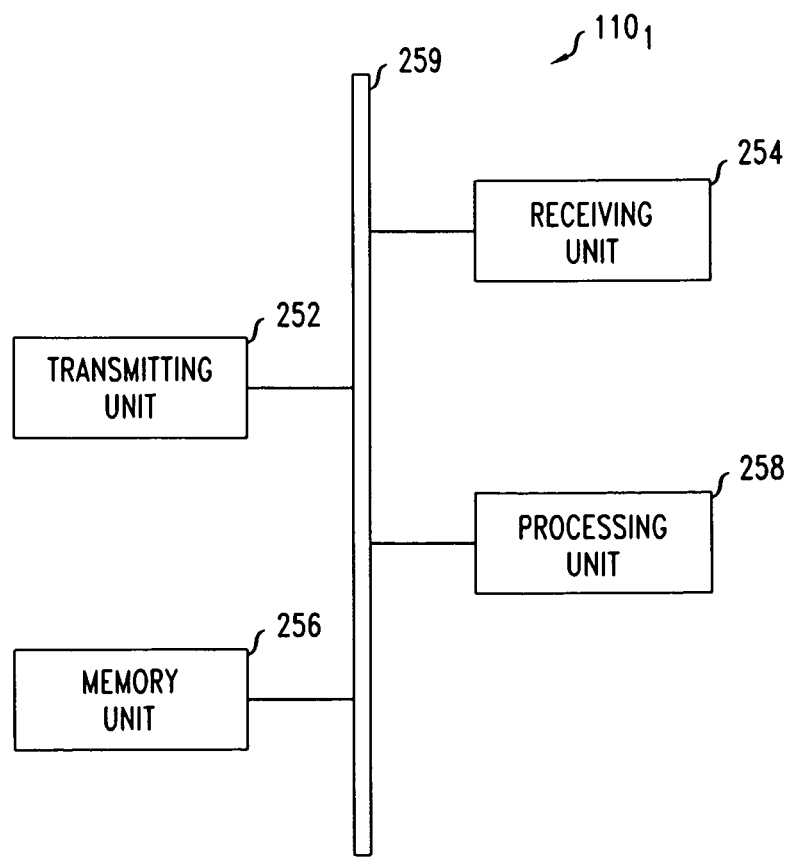

FIG. 7B illustrates an example embodiment of the base station 110₁. It should be also understood that the base station 110₁ may include features not shown in FIG. 7B and should not be limited to those features that are shown.

Referring to FIG. 5B, the base station 110₁ may include, for example, a data bus 259, a transmitting unit 252, a receiving unit 254, a memory unit 256, and a processing unit 258.

The transmitting unit 252, receiving unit 254, memory unit 256, and processing unit 258 may send data to and/or receive data from one another using the data bus 259. The transmitting unit 252 is a device that includes hardware and any necessary software for transmitting wireless signals including, for example, data signals, control signals, and signal strength/quality information via one or more wireless connections to other network elements in the wireless communications network 100.

The receiving unit 254 is a device that includes hardware and any necessary software for receiving wireless signals including, for example, data signals, control signals, and signal strength/quality information via one or more wireless connections to other network elements in the network 100.

The memory unit 256 may be any device capable of storing data including magnetic storage, flash storage, etc.

The processing unit 258 may be any device capable of processing data including, for example, a microprocessor configured to carry out specific operations based on input data, or capable of executing instructions included in computer readable code.

For example, the processing unit 258 is capable of determining a speed of the UE and controlling a HO from the serving base station to a second base station based on the speed of the UE, as described above. Furthermore, the processing unit 258 is configured to perform handover measurements regarding a handover from a serving macro cell to a target small cell based on a velocity of the UE relative to the target cell.

Example embodiments being thus described, it will be obvious that the same may be varied in many ways. Such variations are not to be regarded as a departure from the spirit and scope of example embodiments, and all such modifications as would be obvious to one skilled in the art are intended to be included within the scope of the claims.

What is claimed is:

1. A method of controlling a handover of a user equipment (UE) from a serving base station to a target base station in a heterogeneous network, the method comprising:
   determining, by a serving base station, a speed of the UE and a the type of the handover, the type of the handover being one of macro cell to macro cell, macro cell to small cell, small cell to macro cell and small cell to small cell; and
   controlling, by the serving base station, the handover from the serving base station to the target base station based on the speed of the UE and the type of the handover, wherein the controlling includes,
      classifying the speed of the UE into one of a low speed, medium speed and high speed.

2. The method of claim 1, wherein the controlling includes, preventing the handover to a small cell if the speed of the UE is the high speed, the target base station serving the small cell.

3. The method of claim 2, wherein the controlling includes, scheduling the UE for transmission on almost blank subframes (ABS) of the target base station.

4. The method of claim 1, wherein the controlling includes, increasing a handover threshold if the speed of the UE is the low speed, and
   handing over the UE if the handover threshold exceeds a difference between the reference signal received power (RSRPs) of the target base station and the serving base station at the UE.

5. The method of claim 1, wherein the controlling includes, decreasing a time-to-trigger (TTT) handover period if the speed of the UE is the high speed.

6. The method of claim 5, wherein the controlling includes, decreasing a handover threshold if the speed of the UE is the high speed, and
   handing over the UE if the handover threshold exceeds a difference between the reference signal received power (RSRPs) of the target and serving base stations at the UE.

7. The method of claim 1, wherein the controlling includes, adjusting a handover threshold if the speed of the UE is the medium speed, and
   handing over the UE if the handover threshold exceeds a difference between the reference signal received power (RSRPs) of the target and serving base stations at the UE.

8. The method of claim 1, further comprising:
   determining a direction of the UE, and the controlling includes, controlling, by the serving base station, the handover from the serving base station to the target base station based on a velocity of the UE, the velocity being the speed and direction of the UE.

9. The method of claim 8, wherein the controlling includes, preventing the handover if the speed of the UE is the high speed.

10. The method of claim 8, wherein the controlling includes,
changing a handover threshold based on the velocity of the UE, and
handing over the UE if the handover threshold exceeds a difference between the reference signal received power (RSRPs) of the target and serving base stations at the UE.

11. The method of claim 8, wherein the controlling includes, changing a time-to-trigger (TTT) handover period based on the velocity of the UE.

12. The method of claim 8, wherein the controlling includes,
adjusting a layer 3 filter K value based on the velocity of the UE.

13. A method of controlling a handover of a user equipment (UE) from a serving base station to a target base station in a heterogeneous network, the method comprising:
determining, by a serving base station, a speed of the UE and a the type of the handover, the type of the handover being one of macro cell to macro cell, macro cell to small cell, small cell to macro cell and small cell to small cell; and
controlling, by the serving base station, the handover from the serving base station to the target base station based on the speed of the UE and the type of the handover, wherein the controlling includes,
changing a handover threshold based on the speed of the UE, and
handing over the UE if the handover threshold exceeds a difference between the reference signal received power (RSRPs) of the target and serving base stations at the UE.

14. A method of controlling a handover of a user equipment (UE) from a serving base station to a target base station in a heterogeneous network, the method comprising:
determining, by a serving base station, a speed of the UE and a the type of the handover, the type of the handover being one of macro cell to macro cell, macro cell to small cell, small cell to macro cell and small cell to small cell; and
controlling, by the serving base station, the handover from the serving base station to the target base station based on the speed of the UE and the type of the handover, wherein the controlling includes,
changing a time-to-trigger (TTT) handover period based on the speed of the UE.

15. A method of controlling a handover of a user equipment (UE) from a serving base station to a target base station in a heterogeneous network, the method comprising:
determining, by a serving base station, a speed of the UE and a the type of the handover, the type of the handover being one of macro cell to macro cell, macro cell to small cell, small cell to macro cell and small cell to small cell; and
controlling, by the serving base station, the handover from the serving base station to the target base station based on the speed of the UE and the type of the handover, wherein the controlling includes,
adjusting a layer 3 filter 'K' value based on the speed of the UE.

16. A method of controlling a handover of a user equipment (UE) from a serving base station to a target base station in a heterogeneous network, the method comprising:
determining, by a serving base station, a speed of the UE and a the type of the handover, the type of the handover being one of macro cell to macro cell, macro cell to small cell, small cell to macro cell and small cell to small cell; and
controlling, by the serving base station, the handover from the serving base station to the target base station based on the speed of the UE and the type of the handover, wherein the controlling further includes,
changing a handover threshold based on the speed of the UE, the handover threshold being one of a cell specific offset of a cell associated with the target base station, a hysteresis parameter for an event and a system wide common offset parameter for the event.

17. A method of controlling a handover of a user equipment (UE) from a serving base station to a target base station in a heterogeneous network, the method comprising:
determining, by a serving base station, a speed of the UE and a the type of the handover, the type of the handover being one of macro cell to macro cell, macro cell to small cell, small cell to macro cell and small cell to small cell; and
controlling, by the serving base station, the handover from the serving base station to the target base station based on the speed of the UE and the type of the handover, wherein the controlling includes,
adjusting a layer 3 filter 'K' value based on a type of handover, the type of handover being one of macro cell to macro cell, macro cell to small cell, small cell to macro cell and small cell to small cell.

18. A method of controlling a handover of a user equipment (UE) from a serving base station to a target base station in a heterogeneous network, the method comprising:
determining, by a serving base station, a speed of the UE and a the type of the handover, the type of the handover being one of macro cell to macro cell, macro cell to small cell, small cell to macro cell and small cell to small cell; and
controlling, by the serving base station, the handover from the serving base station to the target base station based on the speed of the UE and the type of the handover, wherein the controlling includes,
adjusting a time-to-trigger (TTT) handover period based on the type of the handover.

19. A method of controlling a handover of a user equipment (UE) from a serving base station to a target base station in a heterogeneous network, the method comprising:
determining, by a serving base station, a speed of the UE and a the type of the handover, the type of the handover being one of macro cell to macro cell, macro cell to small cell, small cell to macro cell and small cell to small cell; and
controlling, by the serving base station, the handover from the serving base station to the target base station based on the speed of the UE and the type of the handover, wherein the controlling includes,
scheduling the UE for transmission on almost blank sub-frames (ABS) of the target base station, and
handing over the UE to the target base station.

* * * * *